(12) United States Patent
Tannas, Jr.

(10) Patent No.: US 8,804,090 B2
(45) Date of Patent: Aug. 12, 2014

(54) METHODS FOR CREATING A MINIMALLY VISIBLE SEAL ALONG THE EDGE OF A FLAT PANEL DISPLAY

(76) Inventor: Lawrence E. Tannas, Jr., Orange, CA (US)

( * ) Notice: Subject to any disclaimer, the term of this patent is extended or adjusted under 35 U.S.C. 154(b) by 0 days.

(21) Appl. No.: 13/310,690

(22) Filed: Dec. 2, 2011

(65) Prior Publication Data

US 2012/0140138 A1 Jun. 7, 2012

Related U.S. Application Data

(60) Provisional application No. 61/419,169, filed on Dec. 2, 2010.

(51) Int. Cl.
*G02F 1/1339* (2006.01)

(52) U.S. Cl.
USPC .......................................................... 349/153

(58) Field of Classification Search
USPC .......................................................... 349/153
See application file for complete search history.

(56) References Cited

U.S. PATENT DOCUMENTS

| | | | |
|---|---|---|---|
| 4,275,494 A | 6/1981 | Kohyama et al. | |
| 4,743,099 A | 5/1988 | Dickerson et al. | |
| 5,164,565 A | 11/1992 | Addiego et al. | |
| 5,169,693 A | 12/1992 | Fujimura | |
| 5,278,685 A | 1/1994 | Iwamoto et al. | |
| 5,610,742 A | 3/1997 | Hinata et al. | |
| 5,757,456 A | 5/1998 | Yamazaki et al. | |
| 5,781,258 A | 7/1998 | Dabral et al. | |
| 5,808,719 A | 9/1998 | Fujiwara et al. | |
| 5,812,226 A | 9/1998 | Izumi et al. | |
| 5,851,411 A | 12/1998 | An et al. | |
| 5,929,961 A | 7/1999 | Nishi et al. | |
| 6,099,672 A | 8/2000 | Yamazaki et al. | |
| 6,137,559 A | 10/2000 | Tanaka et al. | |
| 6,191,840 B1 | 2/2001 | Bon | |
| 6,204,906 B1 | 3/2001 | Tannas | |
| 6,236,446 B1 | 5/2001 | Izumi et al. | |
| 6,337,727 B1 * | 1/2002 | Ono et al. | 349/153 |
| 6,476,415 B1 | 11/2002 | Walker et al. | |
| 6,509,949 B1 | 1/2003 | Lu et al. | |
| 6,864,943 B2 * | 3/2005 | Hirakata et al. | 349/153 |
| 7,256,862 B2 | 8/2007 | Chen et al. | |

(Continued)

FOREIGN PATENT DOCUMENTS

| | | |
|---|---|---|
| EP | 0556855 | 8/1993 |
| GB | 2183073 | 5/1987 |

(Continued)

*Primary Examiner* — James Dudek
(74) *Attorney, Agent, or Firm* — William A. English; Vista IP Law Group LLP

(57) ABSTRACT

Methods are provided for sealing edges of resized electronic displays to minimize the size of the seal area as viewed from the front of the display. A target portion of a display is separated from an excess portion, creating an exposing edge. The exposed edge is sealed using a ribbon-like material with adhesive attached across the ends of the plates of the target portion to maintain and seal the gap between the two substrates. It may be desirable to allow two similarly prepared displays to have the resealed edge abutted against each other a minimal mullion between them. The size of the mullion is further minimized by providing pixels to the edge of the substrate being sealed, e.g., such that the active area of the display extends all the way to the edge(s) being abutted together.

24 Claims, 3 Drawing Sheets

(56) References Cited

U.S. PATENT DOCUMENTS

| | | |
|---|---|---|
| 7,595,857 B2 | 9/2009 | Yang et al. |
| 7,780,492 B2 | 8/2010 | Tannas |
| 7,938,051 B2 | 5/2011 | Tannas |
| 8,259,282 B2 | 9/2012 | Tannas |
| 8,497,516 B2 * | 7/2013 | Yamazaki et al. ............ 257/81 |
| 2002/0018175 A1 | 2/2002 | Hong et al. |
| 2002/0033926 A1 | 3/2002 | Nakahara et al. |
| 2002/0044253 A1 | 4/2002 | Masuda et al. |
| 2003/0184706 A1 | 10/2003 | Watson |
| 2004/0074366 A1 | 4/2004 | Choo et al. |
| 2005/0001974 A1 | 1/2005 | Iida et al. |
| 2005/0056127 A1 | 3/2005 | Yamabuchi et al. |
| 2013/0075357 A1 | 3/2013 | Tannas |

FOREIGN PATENT DOCUMENTS

| | | |
|---|---|---|
| GB | 2330423 | 4/1999 |
| GB | 2381080 | 4/2003 |
| JP | 55026516 | 8/1978 |
| JP | 55084918 | 6/1980 |
| JP | 57099615 | 6/1982 |
| JP | 59017532 | 1/1984 |
| JP | 60146228 | 8/1985 |
| JP | 61186941 | 8/1986 |
| JP | 61210326 | 9/1986 |
| JP | 61215524 | 9/1986 |
| JP | 2235026 | 9/1990 |
| JP | 3293633 | 12/1991 |
| JP | 5-045617 | 2/1993 |
| JP | 6-130403 | 5/1994 |
| JP | 08076074 | 3/1996 |
| JP | 08122769 | 5/1996 |
| JP | 08146444 | 6/1996 |
| JP | 9197416 | 7/1997 |
| WO | 9919765 | 4/1999 |
| WO | 03040049 | 5/2003 |
| WO | 2008099988 | 8/2008 |

* cited by examiner

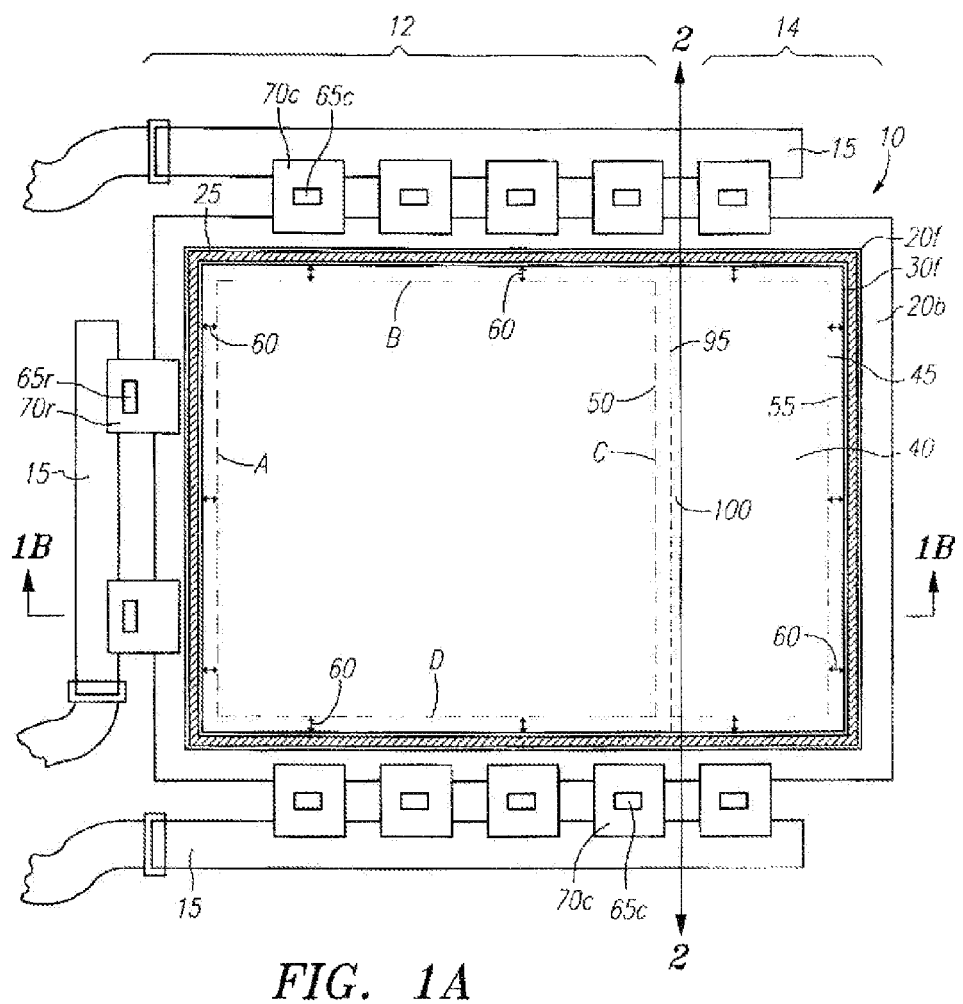
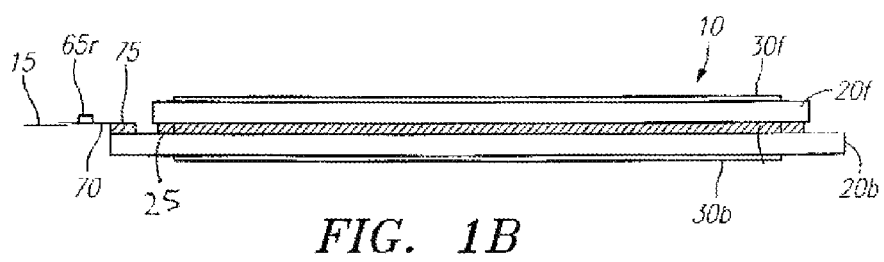

METHODS FOR CREATING A MINIMALLY VISIBLE SEAL ALONG THE EDGE OF A FLAT PANEL DISPLAY

RELATED APPLICATION DATA

This application claims benefit of provisional application Ser. No. 61/419,169, filed Dec. 2, 2010, the entire disclosure of which is expressly incorporated by reference herein.

FIELD OF THE INVENTION

The present application relates to methods for sealing flat panel displays ("FPDs"), e.g., the cut edges of liquid crystal displays ("LCDs") or other electronic displays being resized, and, more particularly, to methods for sealing edges of cut displays to minimize the resulting mullion, e.g., to facilitate tiling multiple displays together to provide a larger effective display area.

BACKGROUND

Typically, flat panel displays ("FPDs") are made from two substrates with an intervening display medium and peripheral seal therebetween. Typically, the seal is created by depositing a liquid sealant material with an appropriate viscosity to the inner surface of one of the substrates about its periphery, or otherwise as necessary, to maintain the proximity of the substrates and the gap between the substrates once the substrates are applied together, to contain the display medium between the substrates, and to seal the edges to prevent contamination.

In the case of a liquid crystal display ("LCD"), the sealant is placed along all four edges on the inner surface of the substrate offset slightly in from the outer edges and typically having a width of a few tenths of an inch (several millimeters), "width" referring to the dimension of the sealant as viewed from the front of the display. Sufficient liquid crystal ("LC") material is deposited into the space between the seal line to fill the entire region bounded by the seal line. The second substrate then is aligned and affixed on the first substrate to create a "cell." The display assembly is cured by methods known to those skilled in the art, e.g., using ultraviolet light and/or heat.

Alternatively, the substrates may be affixed together without the display medium, and the display medium may be injected into the resulting cavity between the substrates through a port in the sealant after the cell is assembled. The port is then sealed to complete the peripheral seal of the cell. In a further alternative, the cell may be filled by the "One Drop Method," as is known in the industry.

The peripheral seal resulting from these methods may extend into the space between the substrates several millimeters from the edges. Thus, the "active area" of the display, i.e., the area of the display in which information may be displayed to a user, has to be offset inwardly from the outer edges of the substrates by at least the width of the peripheral seal.

If two or more displays are placed against one another, i.e., "tiled," to provide a larger effective display area for displaying information, the inactive areas due to the peripheral seals will create a dark or blank band between the active areas of the displays, which may detract from the overall images provided on the tiled displays. For example, the inactive area between two tiled displays will have a width at least equivalent to the sum of the width of the both seals along the contacting edges, e.g., several millimeters. This inactive area is sometimes referred to as a "mullion."

It has been suggested that a pre-manufactured display, e.g., a liquid crystal display, may be reduced in size by cutting the display at a desired location to create an exposed edge adjacent a desired active area to be preserved, and sealing the resulting exposed edge of the preserved portion. Exemplary methods for resizing LCDs are described in U.S. Pat. Nos. 6,204,906, 7,780,492, and 7,938,051, which name the same inventor as the inventor of the present application. The entire disclosure of these references are expressly incorporated by reference herein.

The seal resulting from these methods may extend into the space between the plates from a few to several millimeters from the cut edge. Thus, the original active area of the resized display along the resealed edge occupied by sealant will be inactive and no longer capable of presenting an image. If two such displays are placed against one another, i.e., tiled as described above, to provide a larger effective display area, the resulting inactive areas may create a substantial inactive band or mullion between the active areas of the tiled displays.

Alternatively, U.S. Pat. No. 7,002,660 to Watson (the entire disclosure of which is expressly incorporated by reference herein) discloses a method for sealing the cut edge of a display by applying an external bead of flowable sealant material. Such a bead, however, may have an uneven cross-section and may have a height from a few to several millimeters. Thus, again if two or more of resized displays including such external beads are tiled together, the beads of the resealed edges may abut one another, resulting in a mullion that may also be several millimeters wide, which may reduce the overall effect of the effective display area of the tiled displays.

If the external bead is ground down or otherwise treated to reduce its height or profile, there is a risk that the seal may be damaged or compromised, which may allow display medium to leak from between the substrates contaminants to leak into the display.

SUMMARY

The present application is directed to methods for sealing flat panel displays ("FPDs"), e.g., the cut edges of liquid crystal displays ("LCDs") or other electronic displays being resized. More particularly, the present application is directed to methods for sealing edges of cut displays to minimize the resulting mullion, e.g., to facilitate tiling multiple displays together to provide a larger effective display area with minimal inactive areas between the displays.

In one embodiment, a method is provided for making a FPD with two substrates with intervening display medium and peripheral seal with one or more of the edges having a minimally-visible seal. For an originally manufactured FPD, the FPD may be assembled in a conventional way except for the sealing of one or more display edges, i.e., such that the interior of the FPD is exposed along the one or more edges. The FPD may include circuits or other elements to provide an active image area substantially to the one or more edges. Alternatively, for a completed FPD being resized, one or more edges of the FPD may be removed to create one or more exposed edges.

At the display edges intended for minimally-visible seal, a tape may be applied to the two substrate edges in order to seal the cell. The substrates are held in position using appropriate tooling and/or spacers while the tape is applied to the two substrates edges. Optionally, the substrate spacing may also be controlled using spacers in the cell between the two substrates. The display medium is deposited, or injected, into the display cell before or after the application of the tape to the exposed edges of the substrate. If the display medium is injected into the cell, a port may be provided in one of the seal lines to facilitate filling by injection of the display medium.

The port may then be sealed with tape, sealant, or other conventional methods to complete the seal. The tape may be applied to one or more of the display edges. Sealing of display edges not sealed by the tape may be accomplished by conventional methods known to those skilled in the art.

The tape may include a thin ribbon and adhesive, e.g., having a width corresponding to the width of the substrates across the display edge(s). For example, the thin ribbon may be made of a metal, polyimide, or other material, e.g., used in the tape industry. Optionally, the ribbon may include reinforcement elements embedded in a base material, e.g., fibers, particles, and the like. The adhesive may be provided on the ribbon, may be placed on the edges of the two substrates, or both. For example, the adhesive may be a two-part epoxy with a first component provided on the tape and a second component applied to the cut edge before applying the tape. Thereafter, the ribbon may be brought into contact with the two edges of the substrates to consummate the sealing process.

The resulting seal as viewed from the front of the display may be only as thick as the ribbon and associated adhesive, e.g., may have a substantially uniform thickness of less than one millimeter, e.g., between about 0.001-0.008 inch (0.025-0.2 mm). Further, the active area of the display may be extended substantially all the way to the edges of the display sealed by the tape.

The adhesive may be used to bond the ribbon to the two side edges of the substrates, and may be very thin, e.g., negligible compared to conventional flowable display sealants, which may have a substantial thickness of several millimeters. The ribbon of the tape may be used to provide structural integrity along the sealed edge, e.g., to maintain the relationship of the two substrates and/or maintain the "gap" (the height or distance across the space between the two substrates) between the substrates in concert with spacers between the substrates. The benefits of the tape include providing a relatively thin seal compared to other display seals. The strength of the seal may be enhanced if the tape covers the entire edge of the substrates of the FPD.

Thus, the tape eliminates the need for an external sealant bead or internal adhesive and thus provides a very thin seal. The tape may also provide more rigidity to the seal due to the strength of the ribbon and/or may help preserve the cell spacing.

The methods and systems herein provide for making a very thin seal line for a FPD. This may be used to assemble or "tile" similarly disposed displays to achieve a very narrow combined seal line or "mullion" between the displays. At least one display edge may be sealed using the tape method such that another display made in a similar manner may be abutted against it and achieve minimal combined seal width. For maximum benefit, the pixel circuitry may extend substantially to the edge of the substrate. For example, two displays may be made in a similar manner so that when the two displays are abutted against each other, the mullion between the images of the two displays may be minimized, e.g., to less than two millimeters, e.g., less than one millimeter, e.g., between about 0.002-0.02 inch (0.05-0.5 mm).

In an exemplary embodiment, the FPDs may be LCDs. The methods herein, however, may be equally applicable to other FPDs, such as OLEDs, Plasma Panels, Electroluminescent Panels, and the like. In another embodiment, the FPD may be a resized LCD where the exposed edge made in the resizing process is sealed by the tape method.

In accordance with one embodiment, a flat panel display is provided that includes a first plate comprising four perimeter edges; a second plate comprising four perimeter edges positioned substantially parallel to the first plate such that four perimeter edges are disposed adjacent one another; a peripheral seal disposed between the first and second plates along at least first and second of the perimeter edges; a tape seal applied along at least a third of the perimeter edges and attached to end edges of the first and second plates, the tape seal having a thickness less than one millimeter; and image-generating medium sealed between the first and second plates by the peripheral and tape seals, thereby providing an active image area viewable on the first plate that extends within the boundaries of the peripheral seal and substantially to the third of the perimeter edges.

In accordance with another embodiment, a flat panel display is provided that includes a first display comprising a peripheral seal disposed between first and second plates of the first display along at least first and second perimeter edges of the first and second plates, and a tape seal applied along at least a third of the perimeter edges and attached to end edges of the first and second plates; and a second display comprising a peripheral seal disposed between third and fourth plates of the second display along at least first and second perimeter edges of the third and fourth plates, and a tape seal applied along at least a third of the perimeter edges and attached to end edges of the third and fourth plates; wherein the first and second displays are attached together along the third of the perimeter edges such that active image areas of the first and second displays together provide an effective larger display area, the tape seals along the third of the perimeter edges providing a mullion between the active image areas having a width less than one millimeter.

In accordance with still another embodiment, a method is provided for changing the physical shape of an electronic display, wherein the display comprises front and back plates, a perimeter seal spacing apart the plates and at least partially defining an enclosed cell area between the plates that comprises an original display image area, image-generating medium contained in the area between the plates and within the borders of the perimeter seal, and electrical circuits on inner surfaces of the plates extending through the original display image area. Generally, the method includes cutting the display along desired dimensions that extend across the original display image area resulting in a target display portion and an excess display portion, thereby breaking the perimeter seal, cutting at least some of the electrical circuits, and exposing an edge of the target display portion; and applying a tape seal along the exposed edge of the target display portion, the tape seal attached to end edges of the first and second plates, the tape seal having a thickness less than one millimeter.

In accordance with yet another embodiment, a method is provided for making a flat panel display that includes providing first and second plates, each comprising four perimeter edges; applying a peripheral seal to an inner surface of the first plate along at least first and second of the perimeter edges of the first plate; aligning the second plate adjacent the first plate such that an inner surface of the second plate contact the peripheral seal such that an inner region is defined between the first and second plates; applying a tape seal along at least a third of the perimeter edges and attached to end edges of the first and second plates; and providing image-generating medium sealed in the inner region between the first and second plates by the peripheral and tape seals, thereby providing an active image area viewable on the first plate that extends within the boundaries of the peripheral seal and substantially to the third of the perimeter edges.

In accordance with yet another embodiment, a method is provided to achieve a minimally visible seal along an edge of an FPD wherein the FPD comprises a front substrate and a back substrate, pixels and electrical circuits for operating the display, and display medium to be sealed in a cell formed between the substrates that includes providing an exposed edge along the substrates that communicates with the interior of the display; and applying a ribbon along the exposed edge to seal the interior of the display.

Other aspects and features of the invention will become apparent from consideration of the following description taken in conjunction with the accompanying drawings.

SUMMARY OF THE DRAWINGS

The drawings illustrate exemplary embodiments of the invention, in which:

FIG. 1A is a plan view of a typical liquid crystal display.

FIG. 1B is a cross-sectional view of the display of FIG. 1A, taken along line 1B-1B, with column TABs removed from the cross-section for purposes of clarity.

DESCRIPTION OF THE EXEMPLARY EMBODIMENTS

Figure 2A:
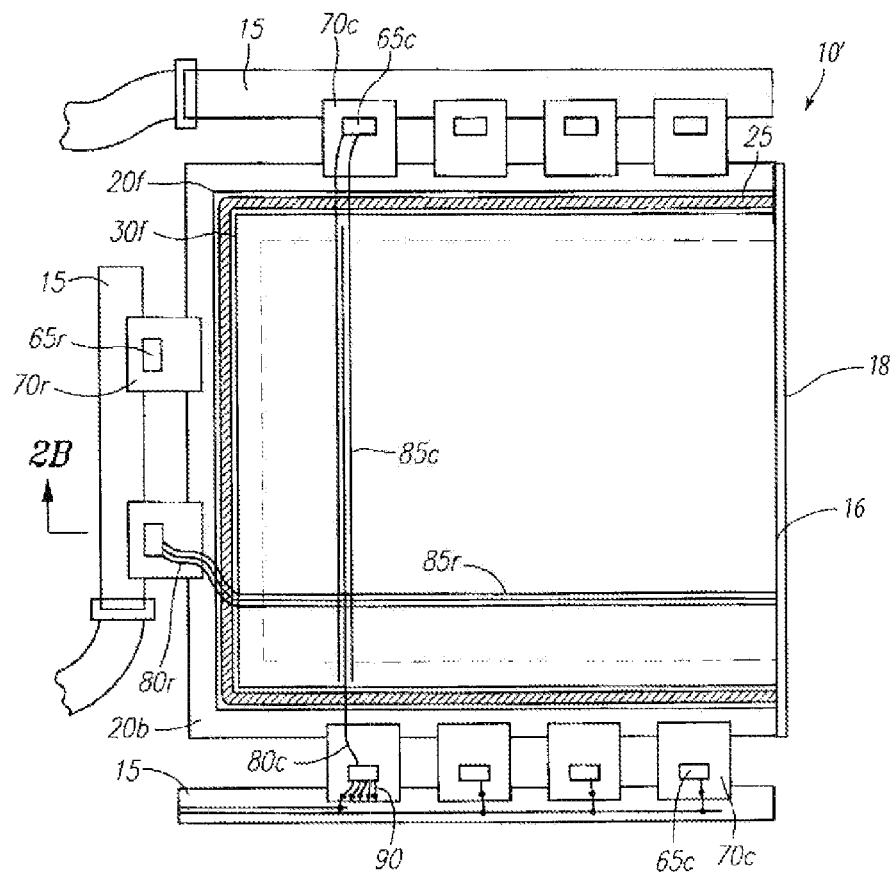
FIG. 2A is a plan view of a resized display made from the display shown in FIG. 1A, by cutting along line 2-2 in FIG. 1A, and then applying a tape seal (not to scale) along the cut edge.

In this application, COTS is an acronym for "Commercial Off-The-Shelf," FPD is an acronym for "Flat-Panel Display," LCD is an acronym for "Liquid Crystal Display," PDLC is an acronym for "Polymer-Dispersed Liquid Crystal," AMLCD is an acronym for "Active Matrix Liquid Crystal Display," TAB is an acronym for "Tape-Automated-Bonding," COG is an acronym for "Chip-On-Glass," UV is an acronym for "ultraviolet," VLSI is an acronym for "Very Large Scale Integration," and HDTV is an acronym for "High-Definition Television."

Turning to the drawings, FIGS. 1A and 1B show a typical non-square (rectangular) COTS AMLCD 10, e.g., before resizing and/or other modification as described elsewhere herein, but after disassembly from its original bezel, frame, and/or other associated hardware and electronics (not shown). For clarity, some of the external components associated with the display 10 (other than the circuit boards 15) are not shown, e.g., that may be bonded or otherwise attached to the plates 20. Such external components may be removed before or while customizing the display 10, as described elsewhere herein.

The display 10 generally includes a front plate 20f and a back plate 20b, e.g., made of glass, such as borosilicate or other hard glass or other substrate material. The plates 20 are held together by a perimeter seal 25, and may be further secured within a bezel (not shown), which, in turn, may be secured to a frame or other hardware (not shown), e.g., for attachment to the target location, e.g., in a cockpit panel of an aircraft. Polarizing films 30f and 30b, filters (not shown), image enhancement films (not shown), retardation films (not shown), viewing angle enhancement films (not shown), and/or other films may exist on the front and/or back outer surfaces of the plates 20.

The original display image area 40 defined by the manufacturer of the display 10 is indicated by dashed perimeter line 45. Dashed line 50 represents the desired right edge of the display image area 40 after customization, as described below. A light-blocking mask (not shown), e.g., an opaque coating, may be provided on at least one of the inner surfaces of the plates 20, e.g., covering a perimeter area around the display image area 40, and extending outwardly to a sufficient distance to serve its purpose. Typically, the distance may be up to the edge of the bezel, or to the inner edge 55 of perimeter seal 25, as indicated by arrows 60 in FIG. 1A. Thus, the display 10 may have an inactive mullion that is several millimeters wide from the edges of the plates 20 due to the peripheral seal 25 and/or the mask.

Row and column electronic drivers 65r and 65c respectively are bonded to TAB substrates 70r and 70c respectively, which in turn are bonded to the edges of the plates 20, e.g., using electrically-anisotropic adhesives known in the art. In avionics, bent TABs (not shown) may be used to save panel area. In addition or alternatively, the drivers 65 may be attached directly to the plates 20 as COGs. The TABs 70 may be bonded or soldered to circuit boards 15, and are electrically connected to external sources via connections 90 to circuit boards 15. COGs (not shown) may be electrically connected to the edges of the display plates 20, which may be electrically connected via ribbon cables to external sources (not shown). For simplicity, a few exemplary connections 90 are shown in FIG. 2A, although it will be understood that they may be provided as desired or needed.

The electronic drivers 65 may include VLSI circuits having corresponding external leads 80r and 80c that are electrically connected through perimeter seal 25 to row and column electric leads 85r and 85c, respectively (see FIG. 2A). Again for simplicity, only a few leads 80 from one row TAB 70r and two column TABs 70c are shown in FIG. 2A, but it is understood that each row TAB 70r and each column TAB 70c may have dozens or even hundreds of individual leads 80. The row and column electric leads 85 may be distributed throughout an image-generating medium, such as liquid crystal ("LC") material (normally transparent) contained between the plates 20, as seen in FIG. 2A.

In addition to holding the plates 20 together, the perimeter seal 25 substantially isolates and protects the image-generating medium from the outside environment. In addition, precisely sized spacers (not shown) may be distributed throughout the image-generating medium. After conventional manufacturing, the region between the plates 20 may be maintained at a partial vacuum to draw the plates 20 against the spacers, e.g., to ensure that the distance between the plates 20 is maintained at a predetermined cell spacing or "cell gap," e.g., between about five (5) and six (6) micrometers, which is appropriate for the display 10 to operate normally. Although an AMLCD is described, it will be appreciated that the tools and methods described herein may be used to customize or otherwise modify other electronic displays, such as passive matrix LCDs, plasma panels, organic LEDs, and the like.

Figure 2B:
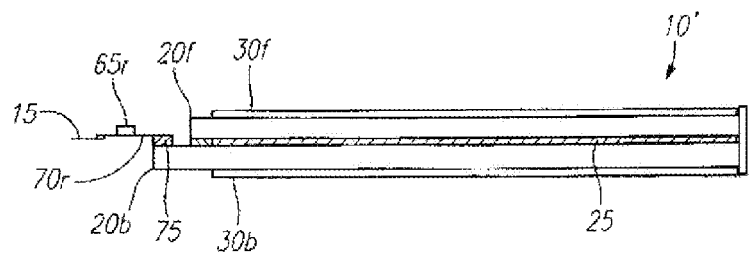
FIG. 2B is a cross-sectional view of the resized display of FIG. 2A, taken along line 2B-2B, showing the tape seal applied along the cut edge.

With reference to FIGS. 2A-3B, an exemplary method is shown for resizing, customizing, and/or otherwise modifying an electronic display, such as the display 10 of FIGS. 1A and 1B, to create a customized display, such as the display 10' shown in FIGS. 2A and 2B. The display 10 may be customized in varying degrees, as necessary or desired, and the examples provided herein are not to be viewed as setting forth required techniques unless specifically so stated. Further, although the steps are provided in a sequential order, it will be appreciated that the order in which the steps are performed may be varied. In addition, one or more of the steps may be eliminated and/or may be substituted with one or more of the steps from other methods described herein or in the references incorporated by reference elsewhere herein.

Initially, a cut line may be identified, such as cut-line 2-2 in FIG. 1A, intended to separate a target portion 12 of the display 10 (e.g., corresponding to the portion to be retained to create the customized display 10') from an excess portion 14 (e.g., corresponding to the portion that may be discarded or saved for other purposes). The cut line may intersect the original display image area 40, to provide a smaller display image area 50. Alternatively, the cut line may be located simply to remove the peripheral seal 25 and/or any masks along the removed edge, e.g., to preserve all of most of the original display image area 40.

In the example shown, the target portion 12 is substantially square, e.g., corresponding to a standard shape of a region of an airplane control panel (not shown). Alternatively, the target portion 12 may have a rectangular, triangular, curved, or other more complicated shape (e.g., which may include cutting one or more additional portions from the target portion 12, as described further elsewhere herein).

Optionally, the display 10 may be removed from its frame assembly, e.g., if a fully assembled display apparatus is being resized. This may include removing any excess electronics that may interfere with a portion of the resizing procedure, and/or that may be modified or replaced with other electronics.

One or more circuit boards, e.g., circuit boards 15 and/or TABs 70, of the display may be cut, e.g., using hand or power tools, such as a hand shear, power saw, and the like. As shown in FIGS. 1A and 2A, the circuit board 15 has been cut generally parallel to cut line 2-2. Optionally, any cut edges may be trimmed or otherwise treated, e.g., using a mill, router, sandpaper, and the like. If the cut-line 2-2 requires cutting through an electronic driver 65, the driver 65 may need to be relocated and/or replaced. Alternatively, the circuit board(s) 15, TABs 70, and/or drivers 65 may be removed entirely, e.g., if new flexible or rigid circuits boards are to be attached to the customized display 10.'

Optionally, one or more polarizers (and/or other films) 30 may be removed from at least a portion of the display 10, e.g., on the exposed surfaces of one or both plates 20 of the display 10. For example, in one embodiment, the polarizer(s) 30 may be scored, e.g., inside the cut-line 2-2, to create a target polarizer portion overlying the target portion, which may be retained during the customization process. The remainder or excess polarizer portion (e.g., overlying the cut-line 2-2 and the excess portion 14 of the display 10) may then be removed and/or discarded. In another embodiment, the polarizer(s) 30 may be scored along two lines on either side of the cut-line 2-2, and the resulting strip may be removed to provide access to the underlying plate(s) 20. Alternatively, the display 10 may not include any polarizers or films, and this step may be omitted.

In one embodiment, a portion of the polarizer(s) 30 immediately overlying the cut-line 2-2 (or offset to either side of the cut-line 2-2, if desired) may be removed to create a narrow trench or channel (not shown) through the polarizer(s) 30 to the surface of the plate(s) 20, e.g., as disclosed in the references incorporated by reference elsewhere herein. In an exemplary embodiment, the polarizer(s) 30 may be sawed using a fine-toothed round saw to cut through and expose the surface of each of the plates 20. After the channel is created, the surface of the display 10 may be cleaned along the cut line 2-2.

Thereafter, one or both plates 20 of the display 10 may be scribed along or offset from the intended cut line 2-2. For example, the plates 20 may be scribed with a scribe wheel (not shown) along the intended cut line 2-2 to create a vent. The display 10 may then be broken along the scribe line(s). For example, the display 10 may be placed on a flat plate of glass and the like (not shown). A strip of material, e.g., a 0.008 inch thick silicone or rubber strip, wire, and the like (also not shown), may be placed on the flat plate before the display 10 such that the cut line 2-2 is substantially parallel to the strip but offset to one side. The cut line 2-2 of the upper plate may then be stroked with a cotton swab or other tool at moderate pressure, e.g., to cause the lower plate of the display 10 to break along the scribe line. The display 10 may be turned over, placed upon the flat plate over the strip and the process repeated to break the (now) lower plate along the scribe line. Thus, the display 10 may be separated into multiple pieces, e.g., into a target portion and an excess portion.

Alternatively, the target portion may be separated from the excess portion using other methods, e.g., sawing or otherwise cutting partially or entirely through the plates 20, either after or without removing the polarizers 30, similar to methods disclosed in the references incorporated by reference elsewhere herein or in U.S. Pat. No. 7,161,651 to Smovzh, the entire disclosure of which is expressly incorporated by reference herein.

Figure 3A:
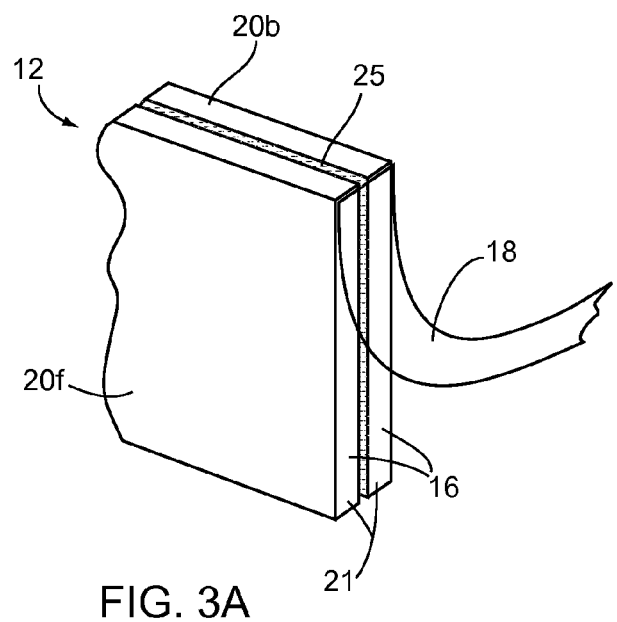
FIGS. 3A and 3B are perspective and side views of a portion of an exposed edge of a display being resized, showing a tape seal being applied to the exposed edge.
Figure 3B:
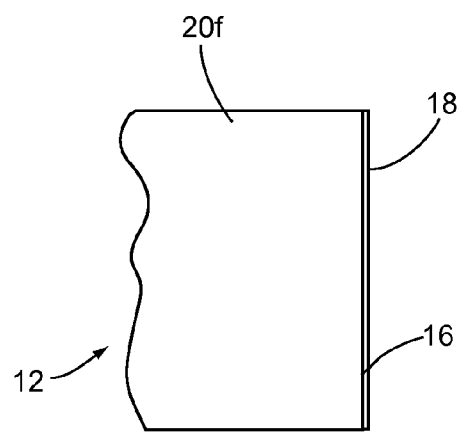

Turning to FIGS. 3A and 3B, the resulting exposed edge 16 of the target portion 12 may then be sealed using tape 18. Optionally, the target portion 12 of the display 10 (the portion to be used for the resized display) may be placed in a pressure plate tool or other fixture (not shown), e.g., to stabilize the target portion 12 in preparation for sealing, similar to the methods disclosed in the references incorporated by reference elsewhere herein. Alternatively, the display 10 may be mounted in a fixture after creating the channels and/or vents but before separating the target portion 12 from the excess portion 14. If or once the plates 20 have separated, e.g., because the target portion 12 has already been separated from the excess portion 14, the fixture may be used to return the plates 20 to their original operational spacing. Optionally, the cut edge 16 made during the resizing process may be cleaned or otherwise prepared, as desired, to receive the tape 18.

Turning to FIGS. 3A and 3B, in an exemplary embodiment, the tape 18 includes a ribbon and one or more adhesives. For example, the ribbon may be a solid strip of material, e.g., formed from metal, glass, polyimide or other polymer, and the like, having a width similar to the width of the cut edge 16, e.g., the width of the edge surfaces 21 of the plates 20, e.g., between about two and ten millimeters (2-10 mm) and a thickness, e.g., a substantially uniform thickness less than one millimeter, e.g., less than about 0.001-0.008 inch (0.025-0.2 mm). Optionally, the ribbon may include a base material, e.g., polymer, in which reinforcing materials, e.g., fibers, particles, spacers, and the like are embedded (not shown). The reinforcement materials may be embedded in a predetermined pattern, e.g., longitudinally along the length of the ribbon, transversely substantially perpendicular to the length, diagonally, e.g., in a zigzag, braid, or other pattern, as desired. For example, the reinforcement materials may extend transversely to provide lateral support to help maintain the cell gap between the plates 20.

A first, e.g., inner, surface of the ribbon includes adhesive thereon to bond or otherwise attach to the edge surfaces 21 of the plates 20. In an exemplary embodiment, the adhesive may be a two-part epoxy with a first component provided on the surface of the ribbon and a second component that may be applied to the edge surfaces 21.

For example, the second component of the adhesive may be sprayed, brushed, or otherwise applied to the edge surfaces 21 of the plates 20, e.g., such that there is minimal penetration of the adhesive into the gap between the plates 20. As shown in FIG. 3A, the tape 18 may then be applied along the edge surfaces 21, e.g., from one end of the cut edge 16 to the other, such that the surface with the first component contacts the edge surfaces 21 and the second component thereon. The components may then react to complete bonding or attachment of the ribbon to the edge surfaces 21. Alternatively, an adhesive may be provided on the ribbon that simply bonds to the edge surfaces 21 without any additional components, or the adhesive may be applied only to the edge surfaces 21 and the tape 18 may be attached to the edge surfaces by the adhesive. Optionally, the adhesive of the tape 18 may be cured, e.g., by exposure to UV light and/or heat, as required, to cause the ribbon to be affixed to the edges 21 of the plates 20 and to contain and seal the display medium from escaping from between the plates 20 or being contaminated by external sources, e.g., as shown in FIG. 3B.

Thus, the tape 18 may span the gap between the plates 20, stabilize the cell thickness, and/or seal the exposed edge 16 by adhering to the edges 21 of the two plates 20. Optionally, the tape 18 may be stretched slightly between the plates 20, e.g., to apply tension to the tape 18 across the edge surfaces 21 to help maintain the desired cell gap.

In an alternative embodiment, the tape 18 may have a width greater than the widths of the edge surfaces 21 (not shown). In this alternative, one edge of the tape 18 may be aligned along one of the edge surfaces 21 and any excess may trimmed off that extends beyond the other of the edge surfaces 21.

Figure 4:
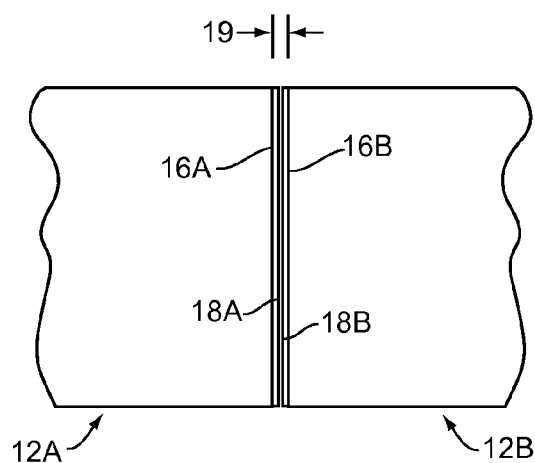
FIG. 4 is a side view of portions of resized displays in which resealed edges of the displays including tape seals are abutted together to provide a tiled display with a larger effective display area.

Turning to FIG. 4, a pair of resized displays 12A, 12B are shown that have had at least one edge 16A, 16B sealed using tape and adhesive 18A, 18B, as described herein. The resized and sealed edges 16A, 16B may be placed against or adjacent one another to provide a tiled display having a larger effective display area than the individual displays. The tiled displays 12A, 12B define a mullion 19 therebetween that is substantially minimized, e.g., compared to conventional displays, due the minimal thickness of the tape 18A, 18B. Thus, if the active areas of the displays 12A, 12B extend substantially to the edges 16A, 16B, images presented on the displays 12A, 12B may appear substantially continuous and/or the lack of image between the displays 12A, 12B may be minimized.

It will be appreciated that more than two displays may be resized and tiled in this manner. For example, four displays may have side edges and lower edges removed and sealed with tape to provide two adjacent sides that have a minimal mullion. These adjacent side edges may then be placed against one another to provide a two-by-two effective display area with minimal mullion between the displays.

Additionally, though the examples used herein generally refer to customizing AMLCDs into square displays (e.g., for avionics applications), the concepts are equally applicable to other types of LCDs or other display technologies, and for other industrial applications including those requiring other customized shapes. The methods herein are also applicable to the manufacturing of new displays.

For example, an originally manufactured FPD may be assembled in a conventional way except for the sealing of one or more display edges, i.e., such that the interior of the FPD is exposed along the one or more edges. The FPD may include circuits or other elements to provide an active image area substantially to the one or more edges. At the display edges, a tape may be applied to the two substrate edges in order to seal the cell, similar to the methods described above, to provide a minimal mullion along the one or more edges.

While the invention is susceptible to various modifications, and alternative forms, specific examples thereof have been shown in the drawings and are herein described in detail. It should be understood, however, that the invention is not to be limited to the particular embodiments or methods disclosed, but to the contrary, the invention is to cover all modifications, equivalents and alternatives falling within the scope of the appended claims.

I claim:

1. A flat panel display, comprising:
a first plate comprising four perimeter edges;
a second plate comprising four perimeter edges positioned substantially parallel to the first plate such that four perimeter edges are disposed adjacent one another;
a peripheral seal disposed between the first and second plates along at least first and second of the perimeter edges;
a tape seal applied along at least a third of the perimeter edges and attached to end edges of the first and second plates, the tape seal having a thickness less than one millimeter; and
image-generating medium sealed between the first and second plates by the peripheral and tape seals such that the image-generating medium contacts an inner surface of the tape seal, thereby providing an active image area viewable on the first plate that extends within the boundaries of the peripheral seal and substantially to the third of the perimeter edges.

2. The flat panel display of claim 1, wherein the peripheral seal is disposed between the first and second plates along a fourth of the perimeter edges.

3. The flat panel display of claim 1, wherein the tape seal is applied along a fourth of the perimeter edges and attached to end edges of the first and second plates.

4. The flat panel display of claim 1, wherein the tape seal comprises at least one of glass, metal, and a polymer.

5. The flat panel display of claim 1, wherein the tape seal has a width similar to the widths of the end edges of the first and second plates.

6. The flat panel display of claim 1, wherein the tape seal comprises reinforcement material embedded in base material.

7. The flat panel display of claim 1, wherein the tape seal is attached to the end edges of the first and second plates by an adhesive.

8. The flat panel display of claim 7, wherein the adhesive comprises a two-part epoxy.

9. The flat panel display of claim 1, wherein the tape seal has a thickness of less than 0.2 millimeter.

10. The flat panel display of claim 1, wherein the tape seal comprises a length of solid tape having a substantially uniform thickness across its width and along its length.

11. A flat panel display, comprising:
a first display comprising a peripheral seal disposed between first and second plates of the first display along at least first and second perimeter edges of the first and second plates, and a first tape seal applied along at least a third of the perimeter edges and attached to end edges of the first and second plates; and
a second display comprising a peripheral seal disposed between third and fourth plates of the second display along at least first and second perimeter edges of the third and fourth plates, and a second tape seal applied along at least a third of the perimeter edges and attached to end edges of the third and fourth plates;

wherein the first and second displays are attached together along the third of the perimeter edges such that active image areas of the first and second displays together provide an effective larger display area that extends entirely to the third of the perimeter edges of each of the first and second displays, the first and second tape seals along the third of the perimeter edges providing a mullion between the active image areas corresponding to the thicknesses of the first and second tape seals and having a width less than one millimeter.

12. The flat panel display of claim 11, wherein the peripheral seal is disposed between the first and second plates along a fourth of the perimeter edges.

13. The flat panel display of claim 12, wherein the peripheral seal is disposed between the third and fourth plates along a fourth of the perimeter edges.

14. The flat panel display of claim 11, wherein the first tape seal is applied along a fourth of the perimeter edges and attached to end edges of the first and second plates.

15. The flat panel display of claim 14, wherein the second tape seal is applied along a fourth of the perimeter edges and attached to end edges of the third and fourth plates.

16. The flat panel display of claim 1, wherein each of the first and second tape seals comprises at least one of glass, metal, and a polymer.

17. The flat panel display of claim 11, wherein the first tape seal has a width similar to the widths of the end edges of the first and second plates, and the second tape seal has a width similar to the widths of the end edges of the third and fourth plates.

18. The flat panel display of claim 11, wherein each of the first and second tape seals comprises reinforcement material embedded in base material.

19. The flat panel display of claim 11, wherein the first tape seal is attached to the end edges of the first and second plates by an adhesive.

20. The flat panel display of claim 11, wherein each of the first and second tape seals has a thickness of less than 0.2 millimeter.

21. The flat panel display of claim 11, wherein each of the first and second tape seals comprises a length of solid tape having a substantially uniform thickness across its width and along its length.

22. The flat panel display of claim 11, wherein image-generating medium is sealed between the first and second plates of the first display by the peripheral and first tape seals such that the image-generating medium contacts an inner surface of the first tape seal, thereby providing an active image area viewable on the first plate that extends within the boundaries of the peripheral seal and substantially to the third of the perimeter edges.

23. The flat panel display of claim 22, wherein image-generating medium is sealed between the third and fourth plates of the second display by the peripheral and second tape seals such that the image-generating medium contacts an inner surface of the second tape seal, thereby providing an active image area viewable on the third plate that extends within the boundaries of the peripheral seal and substantially to the third of the perimeter edges of the second display.

24. The flat panel display of claim 1, wherein the tape seal is applied along at least a third of the perimeter edges such that the tape seal does not extend onto front or back surfaces of the first and second plates.

* * * * *